(12) United States Patent
Engelhardt et al.

(10) Patent No.: US 6,211,988 B1
(45) Date of Patent: Apr. 3, 2001

(54) OPTICAL DEVICE FOR SCANNING A BEAM IN TWO AXES THAT ARE SUBSTANTIALLY PERPENDICULAR TO EACH OTHER

(75) Inventors: Johann Engelhardt, Bad Schönborn; Heinrich Ulrich, Heidelberg, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/331,457

(22) PCT Filed: Dec. 23, 1997

(86) PCT No.: PCT/DE97/03014

§ 371 Date: Aug. 25, 1999

§ 102(e) Date: Aug. 25, 1999

(87) PCT Pub. No.: WO98/28640

PCT Pub. Date: Jul. 2, 1998

(30) Foreign Application Priority Data

Dec. 24, 1996  (DE) ............................................. 196 54 210

(51) Int. Cl.[7] .................................................... G02B 26/08

(52) U.S. Cl. ........................... 359/201; 359/202; 359/203; 359/861; 359/862

(58) Field of Search ....................................... 359/201, 202, 359/203, 368, 385, 389, 861, 862

(56) References Cited

U.S. PATENT DOCUMENTS

| 4,874,215 | 10/1989 | Montagu . |
| 5,225,923 | 7/1993 | Montagu . |
| 5,561,544 | * 10/1996 | Macken ................................ 359/202 |

* cited by examiner

Primary Examiner—Darren Schuberg
(74) Attorney, Agent, or Firm—Simpson, Simpson & Snyder, L.L.P.

(57) ABSTRACT

The invention relates to an optical device for scanning a beam in two axes that are substantially perpendicular to each other, for use in particular in confocal laser scan microscopes, and aims to avoid serious image defects. The invention is characterized in that it has three mirrors (1, 2; 3) of which two mirrors (1, 2) are fixedly positioned at an angle to each other so that they rotate together around the y-axis and in so doing rotate the beam (4) around a pivot point located on the axis of rotation (x-axis) of the third mirror (3) which rotates by itself.

48 Claims, 3 Drawing Sheets

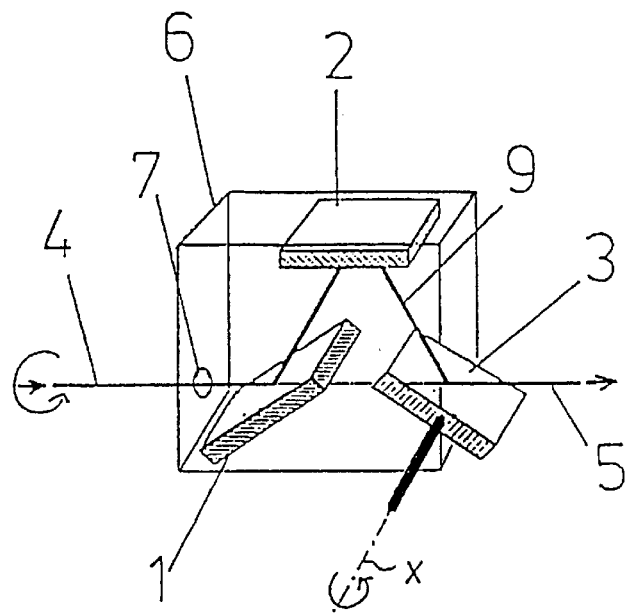
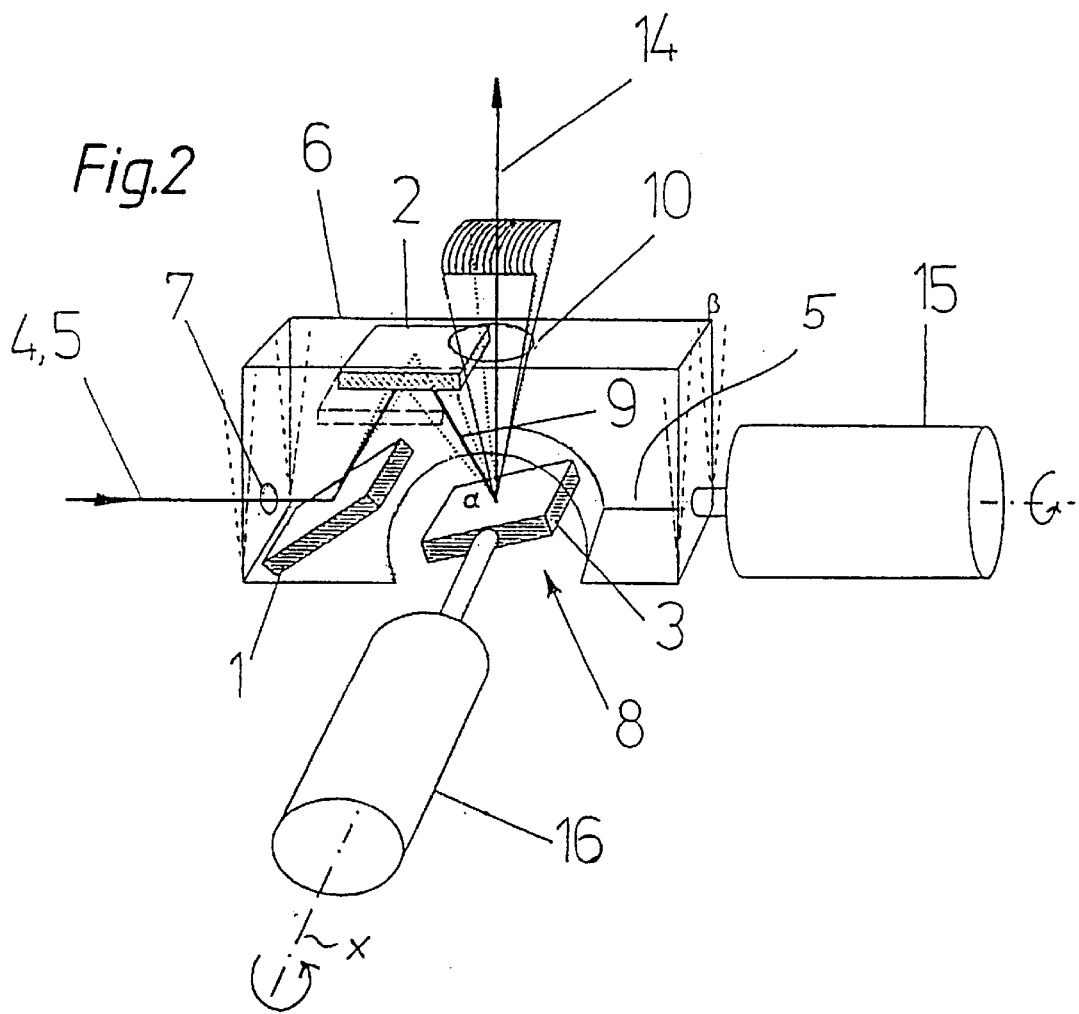

OPTICAL DEVICE FOR SCANNING A BEAM IN TWO AXES THAT ARE SUBSTANTIALLY PERPENDICULAR TO EACH OTHER

BACKGROUND OF THE INVENTION

The invention relates to an optical configuration for scanning a beam in two, fundamentally perpendicular axes, particularly for use in confocal laser scanning microscopes, with two mirrors that can be rotated, each by a drive, around two axes that lie perpendicular to each other (x-axis, y-axis).

Basically what is involved here is a configuration for scanning a beam in two, fundamentally perpendicular axes, the significant feature in the present case being the rotation of the light beam in both axes around the pupil of the lens or a plane conjugated to the lens.

Technical practice is already acquainted with highly differing embodiments of an x-y scanner. Different scanners are known from the paper by J. Montagu: "Two-axis beam steering system, TABS", Proceedings Reprint, SPIE—The International Society for Optical Engineering, Vol. 1920, 1993, pages 162–173 (reprinted from Smart Structures and Materials 1993: "Active and Adaptive Optical Components and Systems II", 1–4 February 1993, Albuquerque, N. Mex.).

With the single mirror scanner, a single mirror is provided that rotates around an axis; the rotating axis of the mirror does not correspond to the optical axis. Single mirror scanners generally comprise a gimbal-mounted mirror for scanning in both the x and y directions.

Here, to be sure, the single mirror minimizes the loss of light that occurs when there is a plurality of mirrors; on the other hand, the x galvanometer must be continuously kept in motion, i.e., its mass must be accelerated and braked. This limits the image rate to about 10 images per second, specifically because of the otherwise excessive vibrational inputs into the microscope system. Furthermore, a resonant scanner cannot be employed due to its required installation.

In a two-mirror scanner, two mirrors positioned at a predetermined angle are provided that normally turn around rotating axes that are orthogonally positioned. This kind of arrangement is not absolutely necessary, however. The incident beam in any case runs parallel to the rotating axis of the last mirror in the beam path.

Furthermore, so-called "paddle" scanners and "golf club" scanners, as special embodiments of the two-mirror scanner, are known to the prior art. In these scanners, rotation of the beam around a virtual pivot point is achieved only approximately, which basically results in imaging errors.

According to A. F. Slomba: "A laser flying spot scanner for use in automated fluorescence antibody instrumentation", Vol. 6, No. 3, May–June 1972, pages 230–234, mirror scanners are also known for use in fluorescence microscopy and in confocal microscopy. Reference is made thereto merely for supplementary purposes.

The known optical configurations discussed above for scanning a beam in two perpendicular axes are problematic in actual practice, and for a number reasons. Foremost among these reasons is certainly the large number of imaging errors, as well as the far-reaching problems associated with the fact that at least one of the drives must be continuously entrained, which results in a very considerable reduction in the image rate. In any case, the known two-mirror designs only approximately allow the beam to be rotated around a virtual pivot point, and a large number of imaging errors consequently arise in these scanners.

SUMMARY OF THE INVENTION

The invention is therefore based on the problem of specifying an optical configuration for scanning a beam in two, basically perpendicular axes, while avoiding serious imaging errors, a configuration that makes possible a high imaging rate for real time application, i.e., at conventional video speed, and in which the image can be easily adjusted or centered, particularly in confocal microscopy.

The configuration according to the invention for scanning a beam in two, basically perpendicular axes solves the above problem with the features described herein. The optical arrangement initially described—a two-mirror scanner—is accordingly supplemented and in such a way that one of the two mirrors is assigned in fixed, rotating fashion to yet another mirror and with a predetermined angular position, such that the assigned mirrors—the first and second mirrors—rotate jointly around the y-axis and thereby rotate the beam around a pivot point that lies on the rotating axis (x-axis) of the third mirror, which rotates in isolation.

According to the invention, further losses in light caused by unavoidable inadequacies in the mirror are tolerated by the third mirror; as with a gimbal-suspension scanning mirror, the arrangement of the three mirrors assures that the pivot point of the beam in the two scanning directions x and y meets in a single point. If this were not the case, the scanning process would result in uncorrectable errors and beam shadings, since a telecentric optical path would no longer be present. The design claimed here produces a slight, y-dependent relative line displacement of:

$$\frac{\Delta x}{y} = \frac{\sin\frac{\beta}{2}}{\tan\gamma}$$

with the y-scanning β-angle and the α-beam angle between the rotational axis of the y-scanner and the beam that falls on the x-scanning mirror.

Given a typical scanning angle of 7°, the line displacement is less than 2% of the image width and is thus negligible for many applications. If necessary, it can be easily corrected, however, with an appropriate y-dependent offset on the x-drive. In special cases, care must also be taken to assure that the polarization on the upper and lower rim of the image is rotated a few degrees. Given the demand for high scanning rates, the disadvantage of using three mirrors instead of one, e.g., with a gimbal suspension, is easily offset, namely by the considerably smaller mass that must be accelerated here. In any case, drives with a higher frequency can also be used, since these are mounted statically in the design according to the invention.

According to the invention, it is in any case essential to minimize imaging errors, even at the price of losses of light, which in numerous applications are of secondary importance, at least in certain situations.

With regard to the concrete embodiment of the optical design that is claimed here, the two jointly rotating mirrors—the first and second mirrors—are positioned in front of the third mirror, which rotates in isolation. The incident beam falls on the first of the two correlated mirrors; more specifically, it advantageously falls along their common rotating axis (y-axis).

With respect to a compact realization of the optical design, it is advantageous if the two correlated mirrors are positioned on a turnable mount; here the angular positions of the mirrors relative to each other is nonadjustable, as is the distance between them. The entire mounting is able to rotate around the optical axis (y-axis) of the incident beam.

Instead of using a simple mount, it is also possible to arrange the two correlated mirrors in a housing, thus providing the mirrors with physical protection. As with the already mentioned mount, the housing would tun around the optical axis (y-axis) of the incoming beam.

The housing furthermore exhibits an entrance hole for the incident beam; here the beam on the rotating axis of the housing strikes, or falls upon, the first of the two associated mirrors, and is reflected to the second mirror. The third mirror can be positioned in rotating fashion outside the housing. In a particularly advantageous version, however, the housing exhibits a recessed area and is at least partially open vis-à-vis this recessed area. The third mirror, which rotates in isolation (x-rotating axis), rotates independent of the housing and is positioned within the housing recess.

In keeping with the position of the first two firmly positioned mirrors within the housing, the beam is reflected from the second mirror to the housing recess, where it falls on the third mirror positioned there and rotating in isolation. From there, the beam is conducted outside of the housing or back into the housing, to be conducted out of the housing through a special exit hole. With the embodiment just described a compact design within the housing is realized; here the third mirror located in the recessed area is positioned in freely rotating fashion, almost within the housing. Finally, the third mirror is partially guarded or covered by the housing, and at the least is largely protected.

In another embodiment a second pair of mirrors can be positioned behind the two mirrors that rotate in joint fashion around the optical axis and are positioned at a predetermined angle—the first and second mirrors—and behind the mirror that rotates in isolation—the third mirror; here the second pair of mirrors consists of two associated mirrors—the fourth and fifth mirrors—that rotate jointly and are positioned at a predetermined angle. Like the first and second mirrors, these fourth and fifth mirrors would be mounted in fixed fashion one relative to the other and their reflecting surfaces would face each other at predetermined angles.

The two additional mirrors could be mounted on a mount rotating around the optical axis, as can be the case with the first two mirrors. The third mirror rotating in isolation around the x-axis could be attached in movable fashion to the second mount; here the third mirror would rotate around the x-axis independent of the second mount, but could swivel jointly with the second mount around the y-axis.

In an especially preferred embodiment the first mount is positioned on top of the second mount and is attached to the latter in rotating fashion around the optical axis; here the ability of the first mount to rotate independent of the second mount has reference to the y-axis, that is, the optical axis.

As in the already discussed three-mirror embodiment, an especially compact embodiment provides for the second pair of associated mirrors—the fourth and fifth mirrors—being positioned in a second housing that rotates around the optical axis (y-axis); here the third mirror, which rotates alone around the x-axis, is positioned in movable fashion within a second housing. Or again, the first housing could be positioned within the second housing and could be attached to the latter in rotating fashion around the optical axis. The independent rotating capability of the first housing again refers in each case to the optical or y-axis.

It has already been indicated several times that the mount or the housing rotates in the optical axis (y-axis) of the incident beam. It is also possible for the outgoing beam to lie in the optical axis of the incident beam. However, it is also conceivable to conduct the outgoing beam at a given angle from the optical axis of the incident beam, e.g., such that the outgoing beam runs orthogonal to the axis of the incident beam.

In a particularly simple embodiment the mirror of the already explained arrangement may exhibit plane surface areas. However, it is also possible to provide the mirror with a surface that is at least slightly curved; here the curvature of the surface can be employed for the purpose of imaging or for the correction of imaging errors.

A very special advantage afforded by the device according to the invention rests in the fact that the drives for the rotating movement of the mirrors, or the mounts or housing, can be decoupled from these components, at least in the structural or physical sense. More specifically, the drives are positioned in locally fixed fashion and are not subject to entrained movement. Consequently, it is easily possible to use galvanometers as drives—including, and particularly, resonant galvanometers with high frequencies—without inducing excessive vibrational input into the microscopic system. Finally, high image rates can be produced which makes real time processing possible.

When galvanometers are used as drives it is also advantageous for the mirrors rotating around the y-axis to be driven by a galvanometer and the mirror rotating around the x-axis to be driven by a resonant galvanometer with a high frequency. Use of a stepper motor as a drive is also conceivable, however.

The rotating capability of the mirror can be realized in whatever way desired; it is sufficient for the mirrors to rotate in a range of up to about 60°. Given the concrete design, a greater rotating range is usually not required.

As stated at the beginning, hyperbolic distortions in the imaging also occur in the design proposed here. These distortions can be advantageously corrected as a function of the y-position. In concrete terms, the hyperbolic distortion can be compensated with a suitable y-dependent offset on the x-drive; care must be taken to assure that the polarization at the upper and lower rim of the image is rotated several degrees.

It is also possible to take into account and correct the hyperbolic distortion starting with the evaluation of the x-position signal. This way of dealing with the hyperbolic distortion could, e.g., be performed after image digitalization.

BRIEF DESCRIPTION OF THE DRAWINGS

There are various possibilities available for advantageously embodying and elaborating the teaching of the present invention. For this purpose, reference is made to the following explanation of the exemplary embodiments of the invention, as based on the drawing. Preferred forms and elaborations of the teaching are also explained in general fashion in conjunction with the explanation of the preferred exemplary embodiments of the invention. Shown in the drawing are:

FIG. 1 in a schematic depiction, an initial embodiment of an optical configuration according the invention for scanning a beam in two, basically perpendicular axes, where of three mirrors is provided;

FIG. 2 the shown in FIG. 2, where the mirrors are positioned in a housing;

DETAILED DESCRIPTION OF THE PREFERRED EMBODIMENTS

Figure 3:
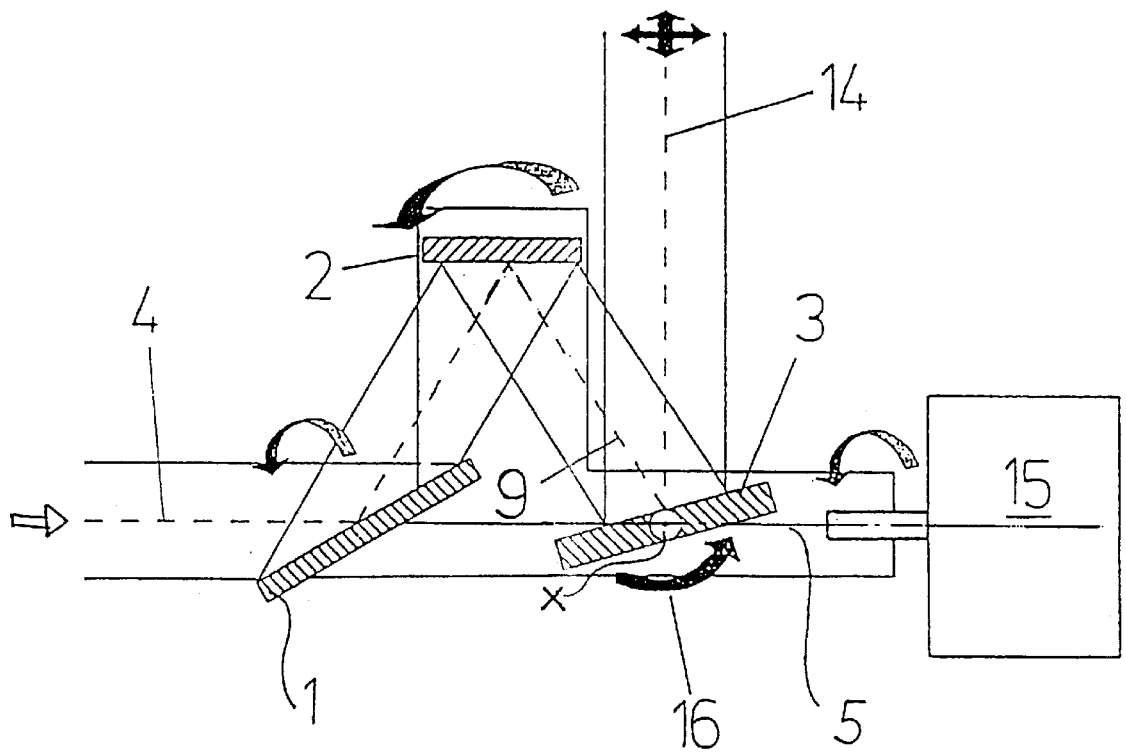
FIG. 3 the configuration shown in FIG. 3 in a schematic view depicting the optical path and the rotating movement of the mirrors.

FIG. 1 shows an optical configuration for scanning a beam in two axes that lie basically perpendicular to each other, a configuration that can be applied particularly in confocal laser scanning microscopes.

The configuration comprises three mirrors 1 to 3, of which two mirrors 1 and 2 can be rotated by a first drive around a first axis, the y-axis, and one mirror 3 can be rotated by a second drive around a second axis, the x-axis, which runs perpendicular to the first axis (y-axis).

According to the invention, a second mirror 2 is assigned to mirror 1 and is placed at a predetermined angular position relative to the latter, such that the associated mirrors 1, 2—the first and second mirrors—rotate jointly around the y-axis and thereby rotate the beam around a pivot point that lies on the rotating axis (x-axis) of the third mirror 3, which rotates in isolation.

The two jointly rotating mirrors 1, 2—the first and second mirrors—are positioned in front of the third mirror 3 rotating in isolation; here the incident beam 4 falls on the first mirror 1 of the two associated mirrors 1, 2, along their common rotating axis 5. As can be seen in FIG. 1, the two partial optical paths between mirrors 1 and 2, on the one hand, and, on the other hand, between mirrors 2 and 3—beam 9—run symmetrically relative to an imaginary perpendicular on mirror 2. As FIG. 2 shows, it is also possible to position mirror 2, which is fixed in stationary fashion within the housing 6, in such a way that the beam 9 runs perpendicular to the y-axis 4 or 5.

In the exemplary embodiment shown in FIGS. 1, 2, and 3 it is indicated schematically that the two associated mirrors 1, 2 are positioned in a housing 6. The housing 6 rotates around the optical axis 5 (y-axis) of the incident beam 4.

FIGS. 1 and 2, furthermore, show that the housing 6 exhibits an entrance hole 7 for the incident beam 4; here the beam 4 in the rotating axis 5 of the housing 6 strikes the first mirror 1 of the associated mirrors 1, 2 and is reflected from the first mirror 1 to the second mirror 2.

As shown in the depiction of FIG. 2, the housing 6 exhibits a recess 8; the housing 6 is open vis-á-vis this recess 8. The third mirror 3 rotating in isolation rotates around the x-axis and within the recess 8, independent of the housing 6.

The beam 9 falling on the mirror 3 rotating in isolation is reflected from the third mirror 3 back into the housing 6 and then through an exit hole 10 out of the housing, for the purpose of imaging.

With reference to FIG. 1, it is again noted that the mirrors 1 and 2 are firmly attached to the housing 6 and rest at a predetermined angular position, one relative to the other. The housing 6 itself is able to rotate around the optical axis 5, which is also the y-axis. The third mirror 3 is able to rotate around the x-axis, which runs orthogonally relative to the optical axis 5.

Rotation of the mirror 3 around the x-axis accordingly scans the image in the x-direction. Rotation of the housing 6 around the optical axis 5 scans the image in the y-direction. Simultaneous rotation of the housing 6 around the optical axis 5 and of the mirror 3 around the x-axis allows the image to be rotated. Resulting y-dependent x-distortions can be corrected by a y-dependent offset. Rotations of the polarization can be corrected by y-dependent rotations of the scanner.

Figure 4:
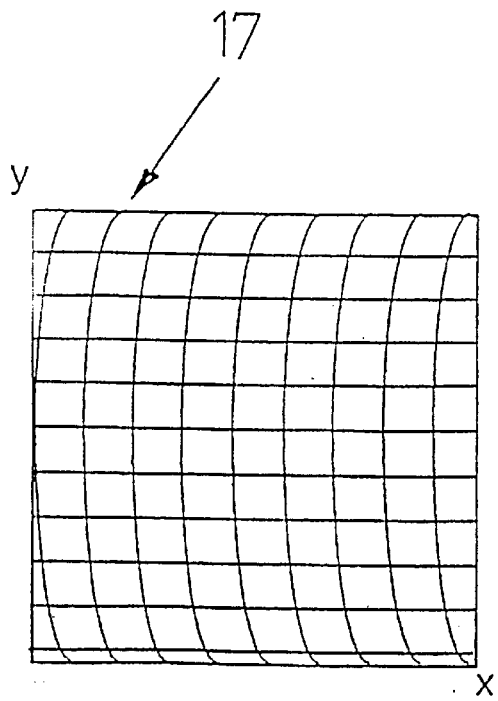
FIG. 4 the image realizable with the device shown in FIG. 3, with imagining errors.

Imaging errors or hyperbolic distortions 17 are depicted in FIG. 4; such distortions 17 arise when a configuration like that shown in FIGS. 1 to 3 is used. With regard to potential correction, we refer for the sake of brevity to the general portion of the description.

Figure 5:
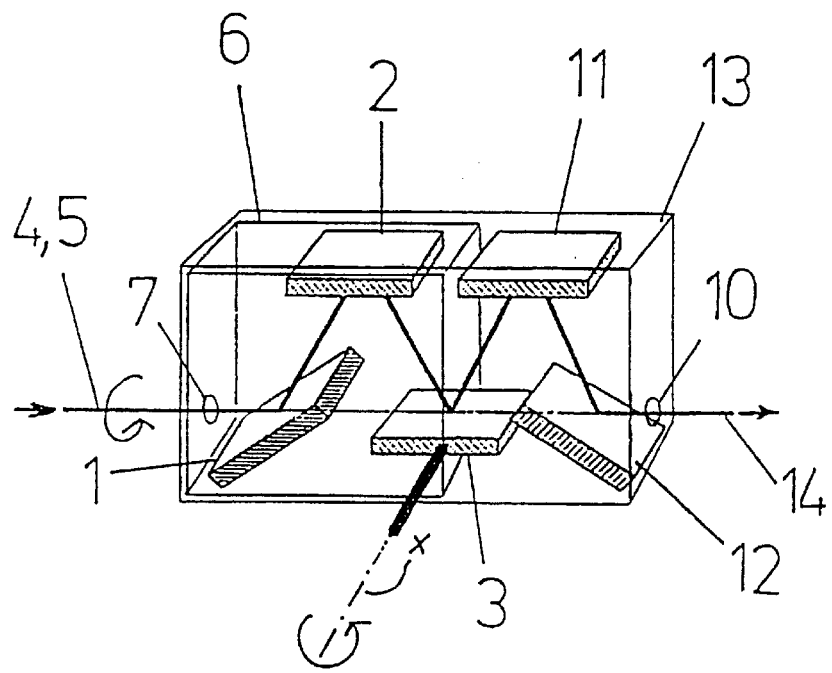
FIG. 5 another exemplary embodiment of the configuration according to the invention, with of total of 5 mirrors, similar to the depiction in FIG. 2.
Figure 6:
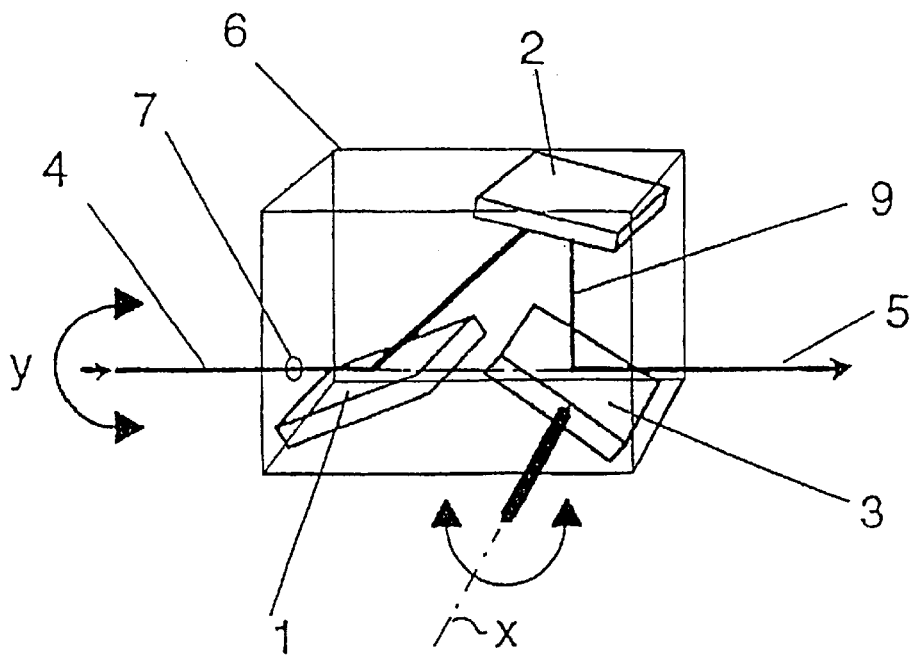
FIG. 6 another exemplary embodiment, similar to FIG. 1.

FIG. 5 depicts another exemplary embodiment of the optical design according to the invention for scanning a beam in two basically perpendicular axes, where the two associated mirrors 1, 2 that face each other at a predetermined angle and jointly rotate around the optical axis 5—the first and second mirrors—and the mirror 3 rotating in isolation—the third mirror—are followed by another pair of mirrors. This second pair of mirrors comprises two associated mirrors 11, 12, that face each other at a predetermined angle and jointly rotate, namely a fourth and fifth mirror.

The two additional mirrors 11, 12 are positioned in a second housing 13 that rotates around the optical axis 5 (y-axis), while the third mirror 3 that rotates alone around the x-axis is movably positioned in the second housing 13. FIG. 5 also schematically indicates that the first housing 6 is positioned in the second housing 13 and is attached to the latter in a manner that permits their joint rotation around the optical axis 5. The outgoing beam 14 lies on the optical axis of the incident beam 4; the outgoing beam can be allowed to run at any desired angle relative to the optical axis.

With reference to FIG. 5, it should again be noted that the mirrors 1 and 2 are firmly connected to the housing 6 and face each other at a predetermined angle. The mirrors 11, 12 are firmly connected to the second housing 13. The third mirror 3 rotating around the x-axis is connected in turning fashion to the second housing 13. The first housing 6 is positioned in the second housing 13 in a manner that allows it to move around the optical axis 5. The second housing 13 can rotate around the optical axis; rotation of the mirror 3 around the x-axis and perpendicular to the optical axis results in scanning in the x-direction.

Rotation of the first housing 6 around the optical axis results in scanning in the y-direction. Rotation of the second housing 13 around the optical axis 5 rotates the image in the center of the field. Reduction of the scanning angle in the x and y direction zooms the image.

The surfaces of the mirrors 1, 2, 11, and 12 used here have a plane design. With respect to a curved design and any associated advantages, reference is made to the general portion of the description.

The drives provided here are galvanometers; the drive for the y-axis is a galvanometer 15, and the drive for the x-axis is a resonant galvanometer 16. Other drives can also be employed.

Finally, it should be especially emphasized that the exemplary embodiments discussed above serve to clarify the claimed teaching, without limiting the teaching to those exemplary embodiments.

LIST OF REFERENCE SYMBOLS 1 first mirror
2 second mirror
3 third mirror (rotating around the x-axis)
4 incident beam
5 rotating axis, optical axis (y-axis)
6 first housing
7 entrance hole into the housing (6)
8 recess in the housing (6)

9 beam, falling on the third mirror (3)
10 exit hole in the housing (6)
11 fourth mirror
12 fifth mirror
13 second housing
14 outgoing beam (from the housing (13))
15 galvanometer (y-axis)
16 resonant galvanometer (x-axis)
17 hyperbolic distortion x x-axis
α scanning angle around the x-axis
β scanning angle around the y-axis

What is claim is:

1. An optical configuration for scanning a beam in two axes that are fundamentally perpendicular to each other, said optical configuration comprising:
   a y-axis;
   an x-axis substantially perpendicular to said y-axis;
   a first mirror and a second mirror for reflecting said beam, said first and second mirrors being fixedly positioned at a predetermined angle relative to one another;
   a first drive for jointly rotating said first and second mirrors about said y-axis such that said beam pivots about a point on said x-axis as said first and second mirrors rotate jointly about said y-axis;
   a third mirror for reflecting said beam; and
   a second drive for rotating said third mirror in isolation about said x-axis.

2. The optical configuration according to claim 1, wherein said first and second mirrors are positioned in an optical path of said beam in front of said third mirror.

3. The optical configuration according to claim 2, wherein said beam is incident along said y-axis and said first mirror is located on said y-axis to receive said incident beam.

4. The optical configuration according to claim 3, wherein said first and second mirrors are positioned on a mount that can be rotated.

5. The optical configuration according to claim 4, wherein said mount rotates about said y-axis.

6. The optical configuration according to claim 3, further comprising a first housing in which said first and second mirrors are positioned.

7. The optical configuration according to claim 6, wherein said second mirror is at a fixed position within said first housing such that said beam leaving said second mirror is directed perpendicular to said y-axis and toward said x-axis.

8. The optical configuration according to claim 6, wherein said first housing is rotated about said y-axis by said first drive.

9. The optical configuration according to claim 7, wherein said first housing is rotated about said y-axis by said first drive.

10. The configuration according to claim 8, wherein said first housing includes an entrance hole for admitting said incident beam and said beam is reflected by said first mirror toward said second mirror.

11. The optical configuration according to claim 10, wherein said first housing includes a recess and is at least partially open facing said recess, and said third mirror is positioned in said recess to rotate independently from said first housing.

12. The optical configuration according to claim 11, wherein said first housing further includes an exit hole, and said beam is reflected by said third mirror through said housing and out said exit hole.

13. The optical configuration according to claim 1, wherein said first, second, and third mirrors each have a planar reflecting surface.

14. The optical configuration according to claim 1, wherein said first, second and third mirrors each have a curved reflecting surface.

15. The optical configuration according to claim 14, wherein said curvature of said reflecting surfaces is used for imaging.

16. The optical configuration according to claim 1, wherein said first and second drives are stationary.

17. The optical configuration according to claim 1, wherein said first and second drives include galvanometers.

18. The optical configuration according to claim 17, wherein said galvanometers include a resonant galvanometer.

19. The optical configuration according to claim 18, wherein said first drive is a galvanometer and said second drive is a resonant galvanometer.

20. The optical configuration according to claim 1, wherein at least one of said first and second drives includes a stepper motor.

21. The optical configuration according to claim 1, wherein said first, second, and third mirrors can be rotated through a range of angles.

22. The optical configuration according 21, wherein said range is about sixty degrees.

23. The optical configuration according to claim 1, further comprising means for correcting hyperbolic distortion in imaging.

24. The optical configuration according to claim 23, wherein said means for correcting hyperbolic distortion includes a suitable y-axis dependent offset on said second drive.

25. The optical configuration according to claim 23, wherein said second drive provides an x-position signal, and said hyperbolic distortion is corrected in evaluating said x-position signal.

26. The optical configuration according to claim 23, further comprising means for digitizing a scanned image and digitally correcting for said hyperbolic distortion.

27. An optical configuration for scanning a beam in two axes that are fundamentally perpendicular to each other, said optical configuration comprising:
   a y-axis;
   an x-axis substantially perpendicular to said y-axis;
   a first mirror and a second mirror for reflecting said beam, said first and second mirrors being fixedly positioned at a predetermined angle relative to one another;
   a first drive for jointly rotating said first and second mirrors about said y-axis such that said beam pivots about a point on said x-axis as said first and second mirrors rotate jointly about said y-axis;
   a third mirror for reflecting said beam;
   a second drive for rotating said third mirror in isolation about said x-axis; and
   a fourth mirror and a fifth mirror for reflecting said beam, said fourth and fifth mirrors being fixedly positioned at a predetermined angle relative to one another and jointly rotatable about said y-axis.

28. The optical configuration according to claim 27, wherein said first and second mirrors are positioned on a first mount that rotates about said y-axis, said fourth and fifth mirrors are positioned on a second mount that rotates about said y-axis, and said third mirror is connected to said second mount such that said third mirror rotates about said x-axis independently of said second mount and about said y-axis with said second mount.

29. The optical configuration according to claim 28, wherein said first mount is positioned on top of said second mount and is connected to said second mount so as to be independently rotatable about said y-axis relative to said second mount.

30. The optical configuration according to claim 27, wherein said first and second mirrors are positioned in a first housing rotatable about said y-axis, said fourth and fifth mirrors are positioned in a second housing rotatable about said y-axis, and said third mirror is movable relative to said second housing.

31. The optical configuration according to claim 30, wherein said first housing is positioned within said second housing and is connected to said second housing for rotation about said y-axis relative to said second housing.

32. The optical configuration according to claim 27, wherein said beam is incident to said first mirror along said y-axis and is reflected from said fifth mirror to exit along said y-axis.

33. The optical configuration according to claim 27, wherein said fifth mirror is selectively positionable for reflecting said beam to exit at a desired angle relative said y-axis.

34. The optical configuration according to claim 27, wherein said first, second, third, fourth, and fifth mirrors each have a planar reflecting surface.

35. The optical configuration according to claim 27, wherein said first, second, third, fourth, and fifth mirrors each have a curved reflecting surface.

36. The optical configuration according to claim 35, wherein said curvature of said reflecting surfaces is used for imaging.

37. The optical configuration according to claim 27, wherein said first and second drives are stationary.

38. The optical configuration according to claim 27, wherein said first and second drives include galvanometers.

39. The optical configuration according to claim 38, wherein said galvanometers include a resonant galvanometer.

40. The optical configuration according to claim 39, wherein said first drive is a galvanometer and said first drive rotates said first, second, fourth and fifth mirrors about said y-axis.

41. The optical configuration according to claim 40, wherein said second drive is a resonant galvanometer.

42. The optical configuration according to claim 27, wherein said first and second drives include a stepper motor.

43. The optical configuration according to claim 27, wherein said first, second, third, fourth, and fifth mirrors can be rotated through a range of angles.

44. The optical configuration according to claim 43, wherein said range is about sixty degrees.

45. The optical configuration according to claim 27, further comprising means for correcting hyperbolic distortion in imaging.

46. The optical configuration according to claim 45, wherein said means for correcting hyperbolic distortion includes a suitable y-axis dependent offset on said second drive.

47. The optical configuration according to claim 45, wherein said second drive provides an x-position signal, and said hyperbolic distortion is corrected in evaluating said x-position signal.

48. The optical configuration according to claim 45, further comprising means for digitizing a scanned image and digitally correcting for said hyperbolic distortion.

* * * * *